United States Patent
Park et al.

(10) Patent No.: US 11,366,983 B2
(45) Date of Patent: Jun. 21, 2022

(54) STUDY-LEVEL MULTI-VIEW PROCESSING SYSTEM

(71) Applicant: International Business Machines Corporation, Armonk, NY (US)

(72) Inventors: Sun Young Park, San Diego, CA (US); Dustin Michael Sargent, San Diego, CA (US); Marwan Sati, Mississauga (CA); Mark D. Bronkalla, Waukesha, WI (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/015,439

(22) Filed: Sep. 9, 2020

(65) Prior Publication Data
US 2022/0076063 A1   Mar. 10, 2022

(51) Int. Cl.
*G06K 9/62*   (2022.01)
*G06N 3/08*   (2006.01)

(52) U.S. Cl.
CPC .......... *G06K 9/6256* (2013.01); *G06K 9/623* (2013.01); *G06N 3/08* (2013.01)

(58) Field of Classification Search
CPC .... G06K 9/6256; G06K 9/623; G06K 9/6232; G06K 9/6267; G06N 3/08; G06N 20/00; G06N 3/0454; G06N 20/10; G06N 20/20; G06N 3/04; G06T 11/60; G06T 2207/20081; G06T 2207/20084; G06T 7/0012; G06T 2207/10016; G06T 7/11; G06T 11/00; G06T 2207/10024; G06T 2207/30096; G06T 7/73; G06T 7/75; G06V 10/82; G06V 20/41; G06V 20/20;
(Continued)

(56) References Cited

U.S. PATENT DOCUMENTS 8,923,551 B1 * 12/2014 Grosz .................... H04L 67/12
                                                     715/202
9,480,439 B2 * 11/2016 Wu ...................... G06V 10/752
(Continued)

OTHER PUBLICATIONS

Dupont, E., et al., "Probabilistic Semantic Inpainting with Pixel Constrained CNNs." Published Feb. 23, 2019. 11 pages. Published by ARXIV. https://arxiv.org/abs/1810.03728.
(Continued)

*Primary Examiner* — Michael S Osinski
(74) *Attorney, Agent, or Firm* — David K. Mattheis; Maeve Carpenter

(57) ABSTRACT

One or more processors may identify a missing image in the set of multi-view images. Each of the images is associated with a particular view type. The one or more processors may generate, utilizing a replacement AI model, a replacement image for the missing image in the set of multi-view images. The replacement image is generated utilizing an AI model trained to generate a replacement image using training images from two or more time-adjacent sets of images. The one or more processors may identify a duplicate image in the set of multi-view images. The one or more processors may generate, utilizing a quality generative AI model, a characteristic improved image based on the duplicate image for the set of multi-view images. The one or more processors may output the replacement image and the characteristic improved image.

20 Claims, 5 Drawing Sheets

(58) Field of Classification Search
CPC ........ G06V 20/40; G06V 20/46; G06V 20/49; G06V 40/171
See application file for complete search history.

(56) References Cited

U.S. PATENT DOCUMENTS

| | | | | |
|---|---|---|---|---|
| 10,140,709 | B2* | 11/2018 | Kisilev | G06T 7/0012 |
| 10,643,662 | B1* | 5/2020 | Lee | G06F 16/7837 |
| 11,314,089 | B2* | 4/2022 | Langner | H04N 13/344 |
| 2011/0158536 | A1* | 6/2011 | Nakano | G06V 40/50 |
| | | | | 382/190 |
| 2012/0314078 | A1* | 12/2012 | Li | G06T 7/35 |
| | | | | 382/103 |
| 2015/0120624 | A1* | 4/2015 | Yokono | G06K 9/6262 |
| | | | | 706/12 |
| 2015/0278224 | A1* | 10/2015 | Jaber | G06F 16/583 |
| | | | | 707/758 |
| 2016/0220212 | A1 | 8/2016 | Duewer | |
| 2017/0372193 | A1 | 12/2017 | Mailhe | |
| 2018/0075581 | A1 | 3/2018 | Shi | |
| 2018/0158210 | A1* | 6/2018 | Estrada | G06K 9/6267 |
| 2018/0167522 | A1* | 6/2018 | Kunieda | H04N 1/00196 |
| 2019/0035431 | A1* | 1/2019 | Attorre | G11B 27/036 |
| 2019/0057500 | A1* | 2/2019 | Vega | G16H 40/63 |
| 2019/0138810 | A1* | 5/2019 | Chen | G06V 10/454 |
| 2020/0036909 | A1* | 1/2020 | Caspi | H04N 5/272 |
| 2020/0134294 | A1* | 4/2020 | Liang | G06V 40/16 |
| 2020/0176112 | A1* | 6/2020 | Sati | G16H 50/20 |
| 2021/0038979 | A1* | 2/2021 | Bleasdale-Shepherd | |
| | | | | G06N 20/20 |
| 2021/0090288 | A1* | 3/2021 | Wang | G06K 9/00 |
| 2021/0166396 | A1* | 6/2021 | Chen | G06T 7/74 |
| 2021/0224957 | A1* | 7/2021 | Iwase | A61B 3/102 |
| 2021/0272288 | A1* | 9/2021 | Takahashi | G06K 9/6256 |
| 2022/0092330 | A1* | 3/2022 | Amano | G06V 20/647 |
| 2022/0114770 | A1* | 4/2022 | Smirnov | G06T 3/4046 |

OTHER PUBLICATIONS

Guan, S., et al., "Breast cancer detection using synthetic mammograms from generative adversarial networks in convolutional neural networks," Published Jul. 6, 2018. 10 pages. Published by SPIE. https://doi.org/10.1117/12.2318100.

Hyland, S., et al., "Real-valued (Medical) Time Series Generation with Recurrent Conditional GANs." Published Dec. 4, 2017. 13 pages. Published by ARXIV. https://arxiv.org/abs/1706.02633.

Isola, P., et al., "Image-to-Image Translation with Conditional Adversarial Networks." Published Nov. 26, 2018. 17 pages. Published by ARXIV. https://arxiv.org/abs/1611.07004.

Jendele, L., et al., "Adversarial Augmentation for Enhancing Classification of Mammography Images." Published Feb. 20, 2019. 15 pages. Published by ARXIV. https://arxiv.org/abs/1902.077624.

Korkinof, D., et al., "High-Resolution Mammogram Synthesis using Progressive Generative Adversarial Networks." Published Sep. 3, 2019. 19 pages. Published by ARXIV. https://arxiv.org/abs/1807.03401.

Mell, et al., "The NIST Definition of Cloud Computing," Recommendations of the National Institute of Standards and Technology, U.S. Department of Commerce, Special Publication 800-145, Sep. 2011, 7 pgs.

Nguyen, T., et al., "Dual Discriminator Generative Adversarial Nets." Published Sep. 12, 2017. 11 pages. Published by ARXIV. https://arxiv.org/abs/1709.03831.

Radford, A., et al., "Unsupervised Representation Learning with Deep Convolutional Generative Adversarial Networks." Published Jan. 7, 2016. 16 pages. Published by ARXIV. https://arxiv.org/abs/1511.06434.

Wu, E., et al., "Conditional Infilling GANs for Data Augmentation in Mammogram Classification." Published Aug. 24, 2018. 8 pages. Published by ARXIV. https://arxiv.org/abs/1807.08093.

* cited by examiner

STUDY-LEVEL MULTI-VIEW PROCESSING SYSTEM

BACKGROUND

The present disclosure relates generally to the field of medical imaging, and more specifically to processing images in a set of multi-view images by utilizing artificial intelligence models.

Use of artificial intelligence in the field of medical imaging is increasingly popular. When medical images are utilized to train artificial intelligence models, the medical images may need to be processed to meet the needs of the artificial intelligence models. Occasionally, mammograms obtained from screening exams may have missing or duplicate images. Duplicate images may be taken during screening exams to address quality issues or due to the limited field of view of some images.

SUMMARY

Embodiments of the present disclosure include a method, computer program product, and system for processing images in a set of multi-view images by utilizing artificial intelligence models.

In some embodiments, one or more processors may identify a missing image in the set of multi-view images. In some embodiments, each of the images in the multi-view set of images is associated with a particular view type. In some embodiments, the one or more processors may generate, utilizing a replacement AI model, a replacement image for the missing image in the set of multi-view images. In some embodiments, the replacement image is generated utilizing an AI model trained to generate a replacement image using training images from two or more time-adjacent sets of images. In some embodiments, the one or more processors may identify a duplicate image in the set of multi-view images. In some embodiments, the duplicate image is an image of the same view type as another image in the set of multi-view images. In some embodiments, the one or more processors may generate, utilizing a quality generative AI model, a characteristic improved image based on the duplicate image for the set of multi-view images. In some embodiments, the one or more processors may output the replacement image and the characteristic improved image.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
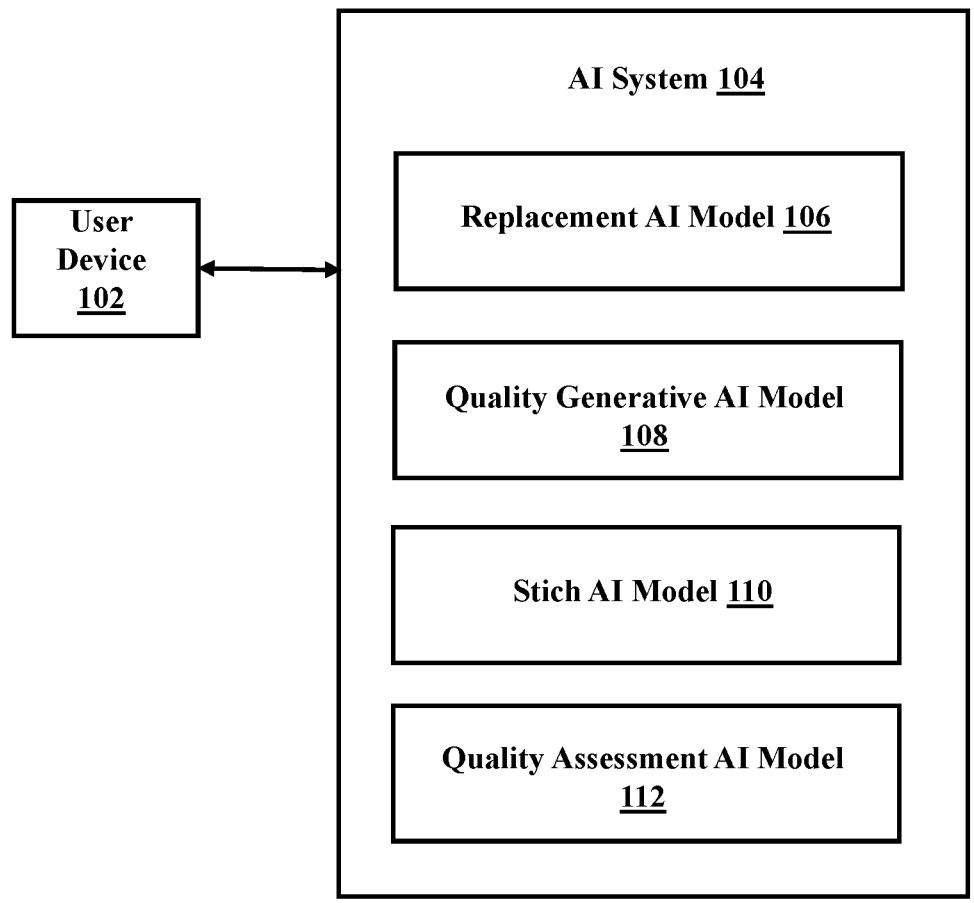
FIG. 1 is a block diagram of an exemplary system for processing images in a set of multi-view images, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of medical imaging, and more specifically to processing images in a set of multi-view images by utilizing artificial intelligence models. While the present disclosure is not necessarily limited to such applications, various aspects of the disclosure may be appreciated through a discussion of various examples using this context.

Use of artificial intelligence ("AI") in the field of medical imaging is increasingly popular. When medical images are utilized to train artificial intelligence models, the medical images may need to be processed to meet the needs of the artificial intelligence models. Occasionally, mammograms obtained from screening exams may have missing or duplicate images. Duplicate images may be taken during screening exams to address quality issues, due to a limited field of view of some images, or where some images are magnified views.

Typically, images that are used to train AI models are in sets of specific numbers of images, with each image having a particular view type. When there are duplicate images it can be difficult for a user to select which of the training images to provide to the AI. A link between prior and current exams may not be straight-forward when there are multiple valid images (e.g., multiple high-quality images of the same object, etc.). Further, Study-level Computer Aided Detection ("CAD") design is limited by sets of images with missing or duplicate images. Therefore, there is a need in the field of medical imaging for a method, which is disclosed herein, that provides a manner to manage missing and/or duplicate images.

In some embodiments, a method for processing images in a set of multi-view images utilizing AI is provided. In some embodiments, one or more processors may identify a missing image in the set of multi-view images. In some embodiment, each of the images in the set of multi-view images may be associated with a particular view type. In some embodiments, the set of multi-view images may include, when not missing an image, images of a predetermined variety of view types. In some embodiments, the multi-view set of images may be a set of mammogram images.

For example, the set of mammograms images may include images of four view types, left CC view, right CC view, left MLO view, and right MLO view. Each of the views may be associated with a type of image captured during a mammogram screening exam (e.g., having varied spatial orientations from where the images were taken) and a particular organ (e.g., right or left).

In some embodiments, the missing image may be identified based on identification data that is associated with, and identifies, the view type of each image in the set. In some embodiments, the identification data may be extracted by the one or more processors during preprocessing from data sets associated with the image. In some embodiments, the data sets may include information obtained from user input (e.g., annotations) or from reports (e.g., medical reports, computer aided diagnosis ("CAD") marks) associated with the images.

In some embodiments, the images in the set of multi-view images may be medical images that reveal internal structures of the body hidden by the skin. The images may be radiological images generated through imaging technologies, such as X-ray radiography, magnetic resonance imaging, ultrasound, endoscopy, elastography, tactile imaging, thermography, medical photography, and/or nuclear medicine functional imaging techniques, such as, positron emission tomography (PET) and single-photon emission computed tomography (SPECT). In some embodiments, the images may be digital X-rays. In some embodiments, the images may be mammograms.

In some embodiments, the one or more processors may generate, utilizing a replacement AI model, a replacement image for the missing image in the set of multi-view images. In some embodiments, the replacement image may be generated utilizing an AI model trained to generate a replacement image using training images from two or more time-adjacent sets of images. In some embodiments, the replacement image may be generated to be of the same view type as the missing image.

For example, if the missing image is a left CC view image, the replacement image generated by the replacement AI model may be a left CC view image. The replacement AI model may be trained to generate a replacement image using images of the same view type (e.g., left CC view) from time-adjacent images of the same view type. In some embodiments, the time-adjacent images of the same view type may be obtained from time-adjacent sets of images where at least two of the time-adjacent sets of images are not missing images of the particular view type (e.g., left CC view).

For example, each set of images may be a set of mammogram images having images of various view types taken during periodic (e.g., yearly, bi-annual, etc.) screening exams, and the time-adjacent sets of images may be mammogram images taken during screening exams, which directly preceded or followed the screening exam during which the set of mammogram images for which a replacement image is generated was taken. In some embodiments, the replacement AI model utilizes a generative adversarial network architecture.

In some embodiments, the one or more processors may identify a duplicate image in the set of multi-view images. In some embodiments, the duplicate image may be an image of the same view type as another image in the set of multi-view images. For example, the one or more processors may identify, based on identification data associated with each image, that there are two images labeled as right CC view images in the set of multi-view images.

In some embodiments, the one or more processors, may generate, utilizing a quality generative AI model, a characteristic improved image based on the duplicate image for the set of multi-view images. For example, a pair of images that are duplicates (e.g., two right CC view images) may be input into a quality generative AI model. The quality generative AI model may output an image of the right CC view type, where the output right CC view type image is the characteristic improved image. In some embodiments, the characteristic improved image may have at least one image characteristic, which is equal to or better than that of one (or both) of the input images. In some embodiments, the image characteristic may be a characteristic indicative of the quality of the image (e.g., resolution, sharpness or blur, motion blurring, characteristics indicative of geometric magnification, characteristics indicative of spot or localized compression, characteristics indicative of use of a contrast agent, or characteristics indicative of dual energy subtraction, etc.). In some embodiments, the image characteristic may be degraded manually using known image manipulation techniques (e.g., making the image blurrier, etc.) to create training images to train the model.

In some embodiments, the one or more processors may output the replacement image and the characteristic improved image. In some embodiments, the replacement image and the characteristic improved image may be output (e.g., displayed) to a user to view. In some embodiments, the characteristic improved image and the replacement image may be output to a computer system that utilizes the set of multi-view images, which have a predetermined number of images having a predetermined variety of view types, as data for training machine learning models.

For example, the set of multi-view images may be a set of mammogram images taken during a screening exam for a patient having four images, one of each of the following types: right CC, left CC, right MLO, left MLO. The CC& MLO views are standard screening views but others may be used or added to aid in visualization of lesions or differentiate between structures that may be superimposed in one of the views. These images may be utilized to perform studies related to the treatment or diagnosis of breast cancer, developing machine learning techniques to aid in the treatment or diagnosis of breast cancer, or developing machine learning techniques related to image classification, object detection, lesion classification (e.g., calcification, solid mass, cyst, benign, malignant, suspicious, or probably malignant), image quality control (e.g., where some images or the study may be rejected to be re-acquired due to technical defects such as poor positioning/lack of required anatomical coverage, motion blurring, etc.), etc.

In some embodiments, the one or more processors may identify a partial image and a second image, where the partial image and the second image are of the same view type as each other. For example, the partial image and the second image in the set of multi-view images may both be labeled as right MLO images. In some embodiments, the partial image and the second image may be identified based on identification data that is associated with, and identifies, the view type of each image in the set.

In some embodiments, the partial image may be detected based on a pixel by pixel comparison of a feature in the image. In some embodiments, whether a feature of the pixels exceeds a threshold may be determined, and each pixel in the image may be compared to a neighboring pixel in the image. For example, a pixel in the image may exceed a threshold, indicating that the pixel is of an opaque background. Neighboring pixels may also be of an opaque background. A certain number of opaque background pixels may indicate that the area in the image covered in opaque background pixels does not show a portion of the organ, and the image of the organ may not have been fully captured. Furthering the example, a certain number of opaque background pixels may encompass an area of non-opaque pixels and the opaque background pixels may border the edges of the image, which may indicate that the image is a full image.

In some embodiments, the one or more processors may generate, utilizing a stitch AI model, a combined image having a combined field of view of the partial image and the second image. For example, the partial image may be a medical image of an organ that shows the right most ⅔ of the organ, and the second image may be a partial medical image of the organ which shows the left most ⅔ of the organ. The combined field of view image generated utilizing the stitch AI model may show the entire organ including the right and left portions of the organ and the center portion showing ⅓ of the organ that is shown in both the partial image and the second image.

As another example, the partial image may be a zoomed-in (e.g., magnified) medical image of a small portion of an organ, and the second image may be a complete image that shows the entire organ (e.g., a zoomed-out/global view). In some embodiments, the magnified view image may not be a simple zoomed in view, but rather a view obtained from a different x-ray capture technique that utilizes geometric magnification of the organ. The magnified image may have higher resolution in the plane of the organ but also a limited field of view. The combined field of view image generated utilizing the stitch AI model may show the entire organ including the zoomed-in portion of the organ shown in the partial image.

In some embodiments, there may be multiple second images and the stitch AI model may be applied, in succession, to pairs of images from the set including the partial image and the multiple second images until a single final image is produced. For example, the stitch AI model may combine three images together by first combing two of the three images together to generate a new image and then combining the new image and the third image together. In some embodiments, the stitch AI model may be a GAN.

In some embodiments, the stitch AI model may be trained by utilizing a local discriminator to stitch high resolution boundaries between the one or more partial images and utilizing a global discriminator to ensure full-image cohesiveness. The local discriminator may also preserve local diagnostic regions as in the original image. For example, one of the partial images may be a zoomed-in portion of the organ (for example, a diagnostically important area that was identified in annotations associated with the image) that is combined with an image of the entire organ using the stitch AI model. In some embodiments, the local discriminator may preserve the higher magnification and higher detail from the zoomed-in portion as well as the original, or allow the magnification and detail from the zoomed-in portion to be greater than the magnification and detail in the image of the entire organ, and allow for realistic detail at the boundary.

In some embodiments, during training of the replacement AI model, the one or more processors may receive three training sets of images from a training user, where each image in each training set of images is associated with a particular view type of a set of view types. In some embodiments, the one or more processors may identify that one of the three training sets of images is an incomplete training set. In some embodiments, the incomplete training set may have a missing image. For example, an image may be missing from the incomplete training set when there are no images of a particular view type among the images in the set.

In some embodiments, the one or more processors may identify two time-adjacent training sets. The two time-adjacent training sets may be sets of medical images taken during different screening exams (e.g., taken at different times). The two time-adjacent training sets may be from screening exams that immediately preceded and immediately followed, respectively, a screening exam during which the medical images in the incomplete training set were taken. In some embodiments, the incomplete training set may be created by removing an image from a set of images that was previously not incomplete (e.g., complete).

In some embodiments, from each of the two time-adjacent training sets, an image of the view type of the missing image may be obtained and input to the replacement AI model. A generator may then be utilized to fill in the missing image based on the images of the view type of the missing image from the two-time adjacent training sets. In some embodiments, the replacement AI model may have a generative adversarial network architecture. During training of the replacement AI model, a discriminator may be used to evaluate the performance of the generator in generating a replacement image. The discriminator may ensure that the generated images appear realistic in the context of the corresponding time-adjacent images and related anatomy from the current study (e.g., the set of images having a missing image). In some embodiments, the discriminator utilizes a standard loss function.

An exemplary method for generating a replacement image may involve inputting into a replacement AI model an all-black (e.g., all-opaque) image in place of the missing image. The generator may then fill in the all-black image based on the images of the view type of the missing image from the time-adjacent training sets. The missing regions may be filled in using cues from the other images in the same study and the images in the time-adjacent studies. For example, the left MLO may be missing in the current study (e.g., set of images having a missing image) and present in the prior study (e.g., a set of time-adjacent images). There may be a lesion visible in the current left CC image that is larger than in the prior study. The generator may use the general anatomical structure from the prior left MLO combined with the lesion growth information from the current left CC image. In some embodiments, if there is more than one missing image, all missing images in the multi-view set of images may be filled in by repeatedly applying this method to each pair of images from time-adjacent training sets.

In some embodiments, during training of the replacement AI model, one or more processors may receive four or more training sets of images from a training user, where each image in each training set of images is associated with a particular view type of a set of view types. In some embodiments, the one or more processors may identify that one of the four or more training sets is an incomplete training set. The three or more time-adjacent training sets may be from screening exams that each preceded or followed a screening exam during what time the medical images in the incomplete training set were taken.

From each of the three or more time-adjacent training sets, an image of the view type of the missing image may be obtained and input to the replacement AI model. A time-series generative model may then be utilized to fill in the missing image based on the images of the view type of the missing image from the three or more time-adjacent training sets. In some embodiments, the time-series generative model may have a recurrent neural network ("RNN") architecture, a temporal convolutional network ("TCN") architecture, a long short-term memory ("LSTM") architecture, or any other architecture for a time-series generative model. The timeseries generative model may allow more than two time-adjacent images to be input to generate the replacement image. In some embodiments, the replacement AI model may have a generative adversarial network architecture. During training of the replacement AI model, a discriminator may be used to evaluate the performance of the generator in generating a replacement image.

In some embodiments, an exemplary method for generating a replacement image may involve the generator receiving an arbitrary number of input studies (e.g., sets of images collected from a screening exam) as a time series. Stacked images from a study may then be reshaped into one-dimensional vectors and the generator model becomes a temporal convolutional network. An all-black image is input into a replacement AI model in place of the missing image. The replacement image is constructed by reshaping the one-dimensional vector back into a two-dimensional image.

In some embodiments, during training of the quality generative AI model, one or more processors may identify two or more training images from a user, where the two or more training images are of the same view type. In some embodiments, the two or more training images of the same view type may be identified by identification data. In some embodiments, the two or more training images may be input into a quality generative AI model. In some embodiments, a characteristic improved image may be generated, utilizing the quality generative AI model, based on the two or more training images of the same view type. In some embodiments, the quality generative AI model may be any machine learning model which is configured to be utilized to generate images based on two or more images of a similar type. In some embodiments, the quality generative AI model may utilize a GAN architecture.

In some embodiments, during training of the quality generative AI model, a global discriminator may be used to train the quality generative AI model to generate a realistic image and/or balance between high resolution and quality. For example, two images of the same view type may be two images of the entire organ where one image shows some tissue surrounding the organ (e.g., the pectoral muscle). The characteristic improved image may be generated to show the tissue surrounding the organ. As another example, one of the two images of the same view type may be out of focus. The characteristic improved image may be generated to have greater focus than the out of focus image.

In some embodiments, during training of the replacement AI model, a local discriminator may be used to train the generator to synthesize characteristic improved images with preserved local diagnostic regions. For example, two images of the same view type may include an image of a magnified view of a portion of the organ. The local discriminator may be used to train the generator to preserve the greater magnification of the portion of the organ, and the global discriminator may be used to train the generator to generate realistic images which transition from the magnified portion to the remainder of the organ without unrealistic lines or boundaries between regions of the organ.

In some embodiments, a quality map may be generated, utilizing a quality assessment AI model, for a training image of the training images having the same view type based on detecting one or more low quality areas. The quality map may be a representation of the training image that identifies one or more low quality areas. In some embodiments, the quality map may be a heat map of the quality rating for each pixel of the training image. For example, the quality map may be a pixel by pixel map that provides a quality rating (e.g., 0 to 1 numeric score) to each pixel of the training image, and a quality map may be generated for each of the two or more training images having the same view type.

In some embodiments, the quality map may be input into the quality generative AI model, where a characteristic improved image is generated based on the quality map input into the quality generative AI model. For example, for each of the training images of the same view types, a quality map may be input along with the training image into the quality generative AI model. A characteristic improved image may then be generated based on the quality maps provided. The one or more quality maps may guide the quality generative AI model to generate higher quality images.

In some embodiments, the quality generative AI model utilizes a time-series generative model. For example, when there are three (or possibly more) training images of the same view type, all three training images may be combined by the AI model to generate a characteristic improved image by utilizing a generator that is a time-series generative model. The time series generative model may treat the multiple images as a time series and allow the quality generative AI model to take an arbitrary number of inputs to generate an arbitrary number of outputs.

Referring now to FIG. 1, a block diagram of a network 100 for processing images in a set of multi-view images utilizing artificial intelligence is illustrated. Network 100 includes a user device 102 and an AI system 104, which are configured to be in communication with each other. In some embodiments, first device 102 may be any device that contains a processor configured to perform one or more of the functions, or steps, described herein this disclosure. AI system 104 includes a replacement AI model 106, a quality generative AI model 110, a stitch AI model 112, and a quality assessment AI model 112.

In some embodiments, AI system 104 identifies a missing image in the set of multi-view images. In some embodiments, each of the images in the multi-view set of images is associated with a particular view type. In some embodiments, AI system 104 generates, utilizing the replacement AI model 106, a replacement image for the missing image in the set of multi-view images.

In some embodiments, the replacement image is generated utilizing an AI model trained to generate a replacement image using training images from two or more time-adjacent sets of images. In some embodiments, AI system 104 identifies a duplicate image in the set of multi-view images. In some embodiments, the duplicate image is an image of the same view type as another image in the set of multi-view images. In some embodiments, AI system 104 generates, utilizing the quality generative AI model 108, a characteristic improved image based on the duplicate image for the set of multi-view images.

In some embodiments, AI system 104 generates, utilizing the quality assessment AI model 112, a quality map for the training images having the same view type based on detecting one or more low quality areas. In some embodiments, the quality map is input into the quality generative AI model 108, where the characteristic improved image is generated based on the quality map input into the quality generative AI model 108. In some embodiments, AI system 104 identifies a partial image and a second image. In some embodiments, the partial image and the second image are of the same view type as each other. In some embodiments, AI system 104 generates, utilizing a stitch AI model 110, a combined image having a combined field of view of the partial image and the second image.

In some embodiments, AI system 104 outputs the replacement image, the characteristic improved image, and the combined image. In some embodiments, the user device 102 has a user interface by which a user may view the replacement image, the characteristic improved image, or the combined image. In some embodiments, the user device 102 is part of a computer system having one or more computing devices which utilize the set of multi-view images as data for training machine learning models.

Figure 2:
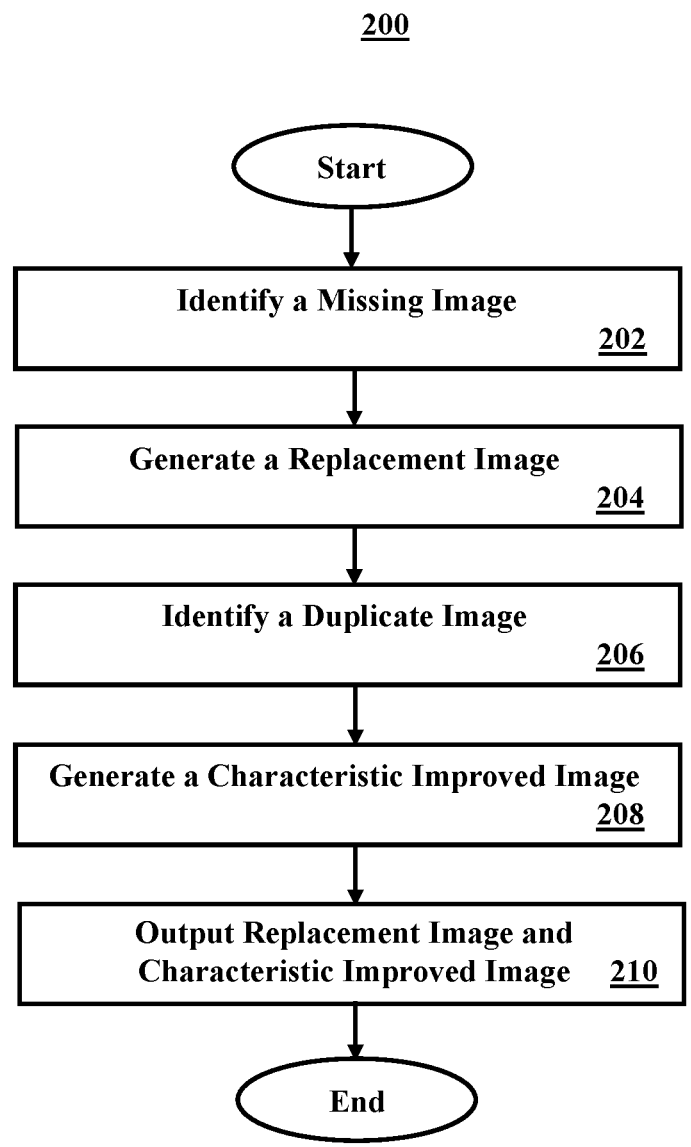
FIG. 2 is a flowchart of an exemplary method for processing images in a set of multi-view images, in accordance with aspects of the present disclosure.

Referring now to FIG. 2, illustrated is a flowchart of an exemplary method 200 for processing images in a set of multi-view images utilizing artificial intelligence, in accordance with aspects of the present disclosure. In some embodiments, one or more processors of a system (e.g., an AI system) may perform the operations of the method 200. In some embodiments, method 200 begins at operation 202. At operation 202, the AI system identifies a missing image in the set of multi-view images. In some embodiments, each of the images in the multi-view set of images is associated with a particular view type.

In some embodiments, method 200 proceeds to operation 204, where the AI system generates, utilizing a replacement AI model, a replacement image for the missing image in the set of multi-view images. In some embodiments, the replacement image is generated utilizing an AI model trained to generate a replacement image using training images from two or more time-adjacent sets of images. In some embodiments, method 200 proceeds to operation 206. At operation 206, the AI system identifies a duplicate image in the set of multi-view images. In some embodiments, the duplicate image is an image of the same view type as another image in the set of multi-view images.

In some embodiments, method 200 proceeds to operation 208. At operation 208, the AI system generates, utilizing a quality generative AI model, a characteristic improved image based on the duplicate image for the set of multi-view images. In some embodiments, method 200 proceeds to operation 210. At operation 210, the AI system outputs the replacement image and the characteristic improved image. In some embodiments, after operation 210 method 200 may end.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
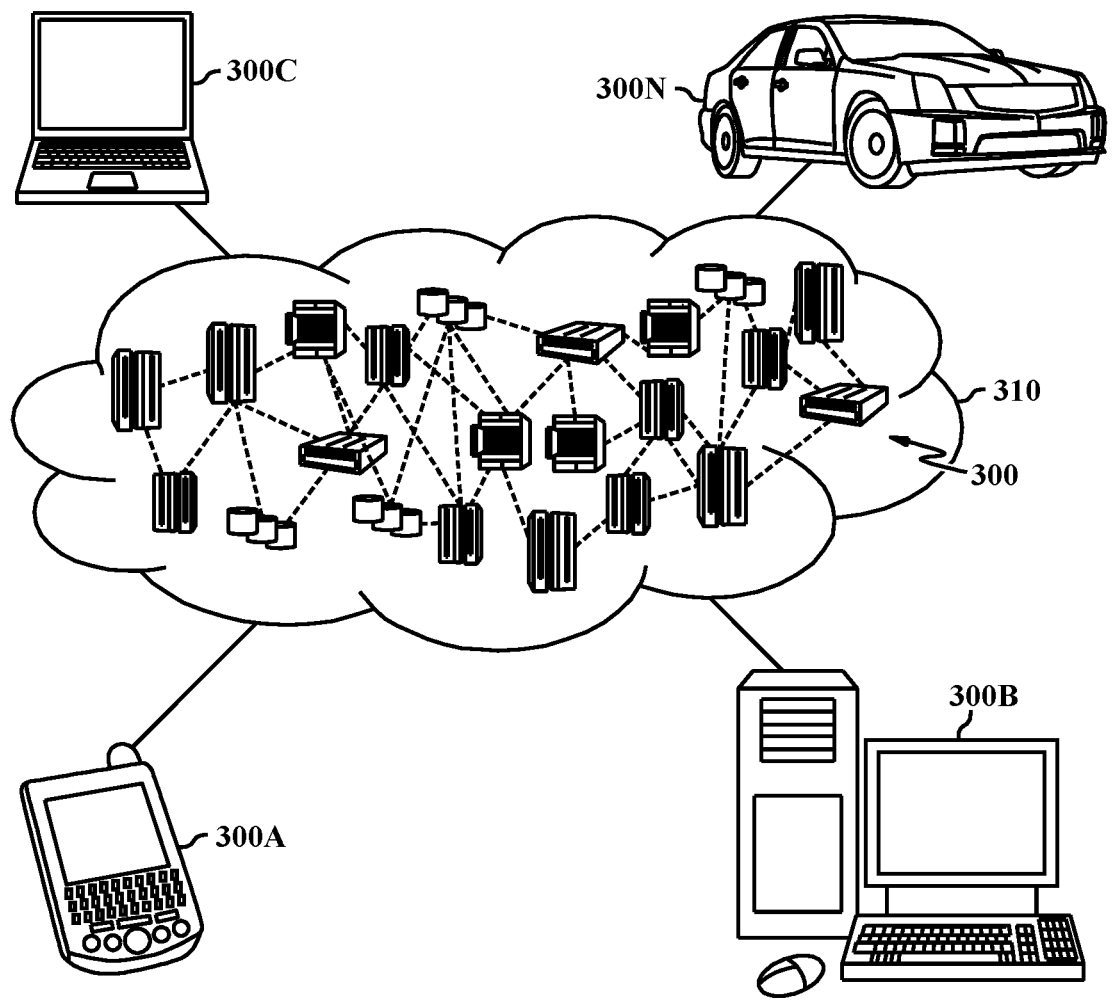
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
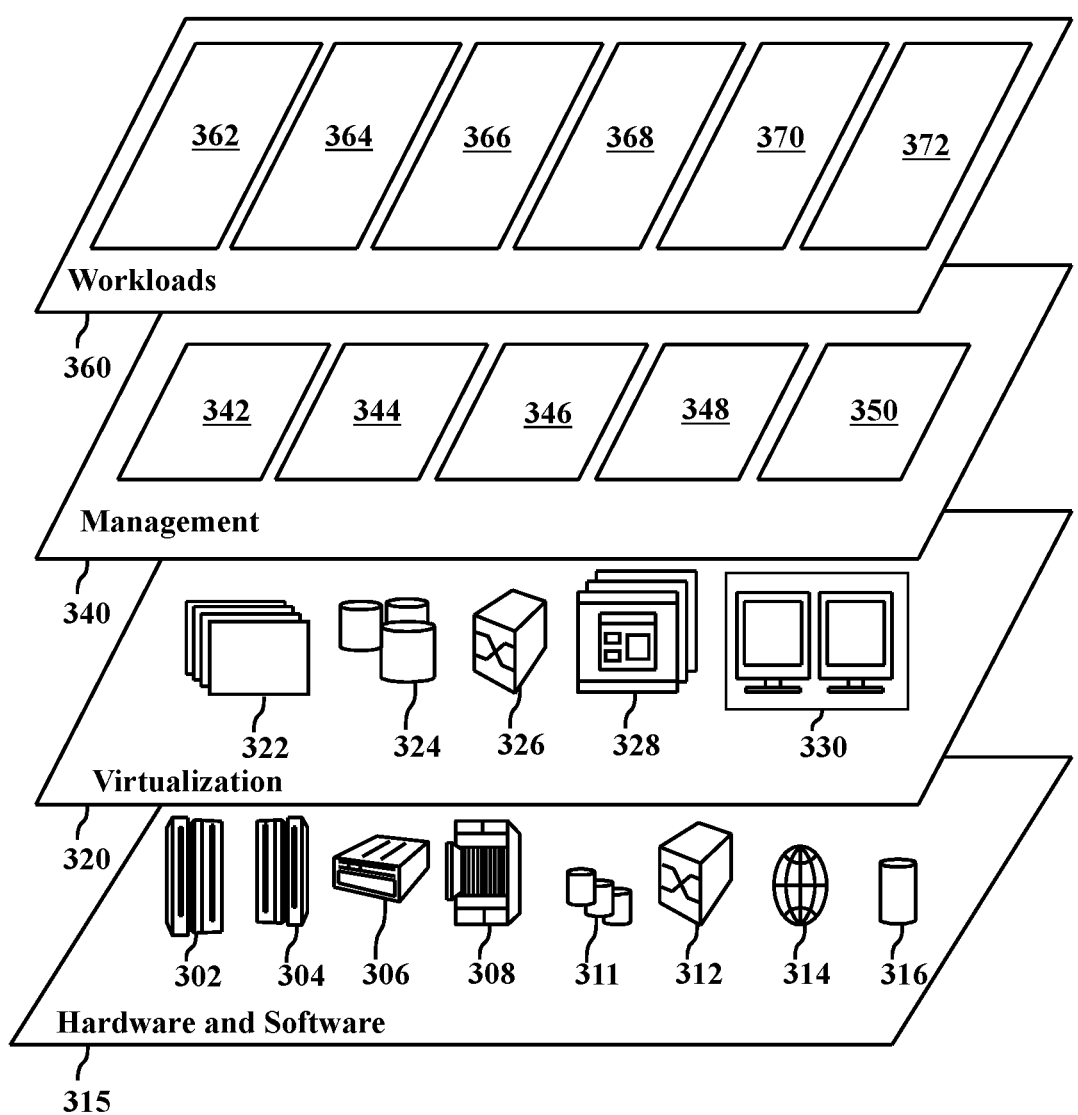
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and processing images in a set of multi-view images 372.

Figure 4:
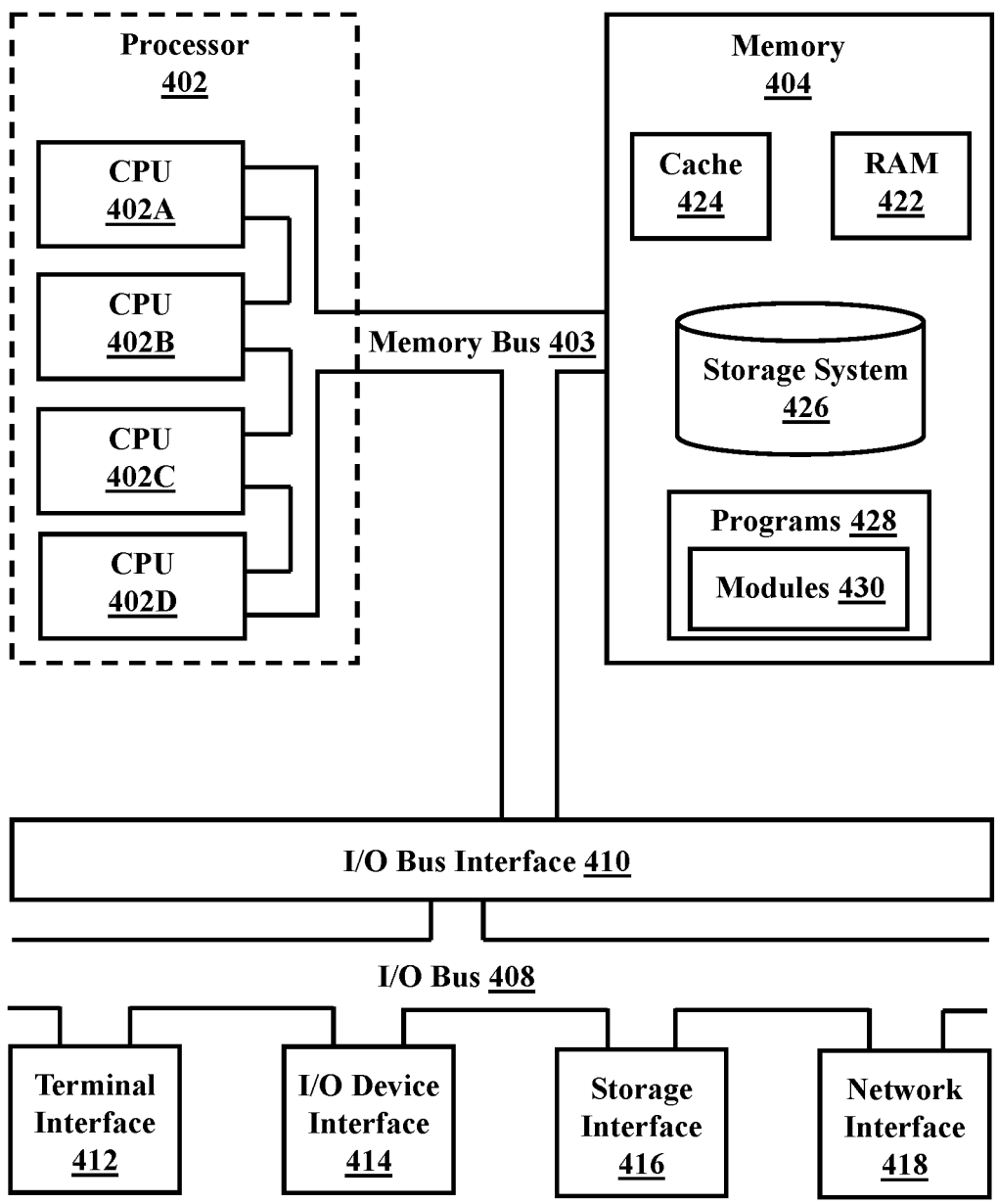
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for processing images in a set of multi-view images utilizing artificial intelligence ("AI"), the method comprising:
    identifying, by one or more processors, a missing image in the set of multi-view images, wherein each of the images in the multi-view set of images is associated with a particular view type;
    generating, utilizing a replacement AI model, a replacement image for the missing image in the set of multi-view images, wherein the replacement image is generated utilizing an AI model trained to generate a replacement image using training images from two or more time-adjacent sets of images;
    identifying a duplicate image in the set of multi-view images, wherein the duplicate image is an image of the same view type as another image in the set of multi-view images;
    generating, utilizing a quality generative AI model, a characteristic improved image based on the duplicate image for the set of multi-view images; and
    outputting the replacement image and the characteristic improved image.

2. The method of claim 1, further comprising:
    identifying a partial image and a second image, wherein the partial image and the second image are of the same view type as each other; and
    generating, utilizing a stitch AI model, a combined image having a combined field of view of the partial image and the second image.

3. The method of claim 1, wherein the replacement AI model was trained by:
    receiving three training sets of images from a training user, wherein each of the images in each of the training sets of images is associated with a particular view type of a set of view types;
    identifying an incomplete training set of the three training sets, wherein the incomplete training set has a missing image, wherein the missing image is associated with a particular view type;
    identifying two time-adjacent training sets of the three training sets, wherein the two time-adjacent training sets are from two exams that are time-adjacent to an exam of the incomplete training set; and
    utilizing a generator to fill in the missing image based on a training image from each of the two time-adjacent training sets.

4. The method of claim 1, wherein the replacement AI model was trained by:
    retrieving four or more training sets of images from a training user, wherein each of the images in each of the training sets of images is associated with a particular view type of a set of view types;
    identifying an incomplete training set of the four or more training sets of images, wherein the incomplete training set has a missing image;
    identifying three or more time-adjacent training sets, wherein the three or more time-adjacent training sets are from exams that are time-adjacent to an exam of the incomplete training set; and
    utilizing a time series generative model to fill in the missing image based on a training image from each of the three or more time-adjacent training sets.

5. The method of claim 1, wherein the quality generative AI model was trained by:
    identifying two or more training images from a user, wherein the two or more training images are of the same view type;
    inputting the two or more training images into a quality generative AI model;
    generating, utilizing the quality generative AI model, a characteristic improved image based on the two or more training images; and
    utilizing a global discriminator to train the quality generative AI model to generate an image.

6. The method of claim 5, wherein the quality generative AI model was further trained by:
    utilizing a local discriminator to train the generator to synthesize characteristic improved images with preserved local diagnostic regions.

7. The method of claim 5, wherein the quality generative AI model was further trained by:
- generating, utilizing a quality assessment AI model, a quality map for the training images having the same view type based on detecting one or more low quality areas; and
- inputting the quality map into the quality generative AI model, wherein the characteristic improved image is generated based on the quality map input into the quality generative AI model.

8. The method of claim 1, wherein the stitch AI model was trained by:
- utilizing a local discriminator to stitch high resolution boundaries between the one or more partial images; and
- utilizing a global discriminator to ensure full image cohesiveness.

9. A system comprising:
- a memory; and
- a processor in communication with the memory, the processor being configured to perform operations comprising:
  - identifying a missing image in the set of multi-view images, wherein each of the images in the multi-view set of images is associated with a particular view type;
  - generating, utilizing a replacement AI model, a replacement image for the missing image in the set of multi-view images, wherein the replacement image is generated utilizing an AI model trained to generate a replacement image using training images from two or more time-adjacent sets of images;
  - identifying a duplicate image in the set of multi-view images, wherein the duplicate image is an image of the same view type as another image in the set of multi-view images;
  - generating, utilizing a quality generative AI model, a characteristic improved image based on the duplicate image for the set of multi-view images; and
  - outputting the replacement image and the characteristic improved image.

10. The system of claim 9, the processor being further configured to perform operations comprising:
- identifying a partial image and a second image, wherein the partial image and the second image are of the same view type as each other; and
- generating, utilizing a stitch AI model, a combined image having a combined field of view of the partial image and the second image.

11. The system of claim 9, wherein the replacement AI model was trained by:
- receiving three training sets of images from a training user, wherein each of the images in each of the training sets of images is associated with a particular view type of a set of view types;
- identifying an incomplete training set of the three training sets, wherein the incomplete training set has a missing image, wherein the missing image is associated with a particular view type;
- identifying two time-adjacent training sets of the three training sets, wherein the two time-adjacent training sets are from two exams that are time-adjacent to an exam of the incomplete training set; and
- utilizing a generator to fill in the missing image based on a training image from each of the two time-adjacent training sets.

12. The system of claim 9, wherein the replacement AI model was trained by:
- retrieving four or more training sets of images from a training user, wherein each of the images in each of the training sets of images is associated with a particular view type of a set of view types;
- identifying an incomplete training set of the four or more training sets of images, wherein the incomplete training set has a missing image;
- identifying three or more time-adjacent training sets, wherein the three or more time-adjacent training sets are from exams that are time-adjacent to an exam of the incomplete training set; and
- utilizing a time-series generative model to fill in the missing image based on a training image from each of the three or more time-adjacent training sets.

13. The system of claim 9, wherein the quality generative AI model was trained by:
- identifying two or more training images from a user, wherein the two or more training images are of the same view type;
- inputting the two or more training images into a quality generative AI model;
- generating, utilizing the quality generative AI model, a characteristic improved image based on the two or more training images; and
- utilizing a global discriminator to train the quality generative AI model to generate an image.

14. The system of claim 13, wherein the quality generative AI model was further trained by:
- utilizing a local discriminator to train the generator to synthesize characteristic improved images with preserved local diagnostic regions.

15. The system of claim 13, wherein the quality generative AI model was further trained by:
- generating, utilizing a quality assessment AI model, a quality map for the training images having the same view type based on detecting one or more low quality areas; and
- inputting the quality map into the quality generative AI model, wherein the characteristic improved image is generated based on the quality map input into the quality generative AI model.

16. A computer program product comprising a non-transitory computer readable storage medium having program instructions embodied therewith, the program instructions executable by a processor to cause the processor to perform operations, the operations comprising:
- identifying a missing image in the set of multi-view images, wherein each of the images in the multi-view set of images is associated with a particular view type;
- generating, utilizing a replacement AI model, a replacement image for the missing image in the set of multi-view images, wherein the replacement image is generated utilizing an AI model trained to generate a replacement image using training images from two or more time-adjacent sets of images;
- identifying a duplicate image in the set of multi-view images, wherein the duplicate image is an image of the same view type as another image in the set of multi-view images;
- generating, utilizing a quality generative AI model, a characteristic improved image based on the duplicate image for the set of multi-view images; and
- outputting the replacement image and the characteristic improved image.

17. The computer program product of claim 16, the processor being further configured to perform operations comprising:

identifying a partial image and a second image, wherein the partial image and the second image are of the same view type as each other; and generating, utilizing a stitch AI model, a combined image having a combined field of view of the partial image and the second image.

18. The computer program product of claim 16, wherein the replacement AI model was trained by:

receiving three training sets of images from a training user, wherein each of the images in each of the training sets of images is associated with a particular view type of a set of view types;

identifying an incomplete training set of the three training sets, wherein the incomplete training set has a missing image, wherein the missing image is associated with a particular view type;

identifying two time-adjacent training sets of the three training sets, wherein the two time-adjacent training sets are from two exams that are time-adjacent to an exam of the incomplete training set; and utilizing a generator to fill in the missing image based on a training image from each of the two time-adjacent training sets.

19. The computer program product of claim 16, wherein the quality generative AI model was trained by:

identifying two or more training images from a user, wherein the two or more training images are of the same view type;

inputting the two or more training images into a quality generative AI model;

generating, utilizing the quality generative AI model, a characteristic improved image based on the two or more training images; and utilizing a global discriminator to train the quality generative AI model to generate an image.

20. The computer program product of claim 19, wherein the quality generative AI model was further trained by:

generating, utilizing a quality assessment AI model, a quality map for the training images having the same view type based on detecting one or more low quality areas; and inputting the quality map into the quality generative AI model, wherein the characteristic improved image is generated based on the quality map input into the quality generative AI model.

\* \* \* \* \*